Nov. 19, 1968  W. K. TEMPLE ET AL  3,411,491
MACHINING APPARATUS FOR DRESSING DEVICES
Filed Jan. 25, 1966  2 Sheets-Sheet 1
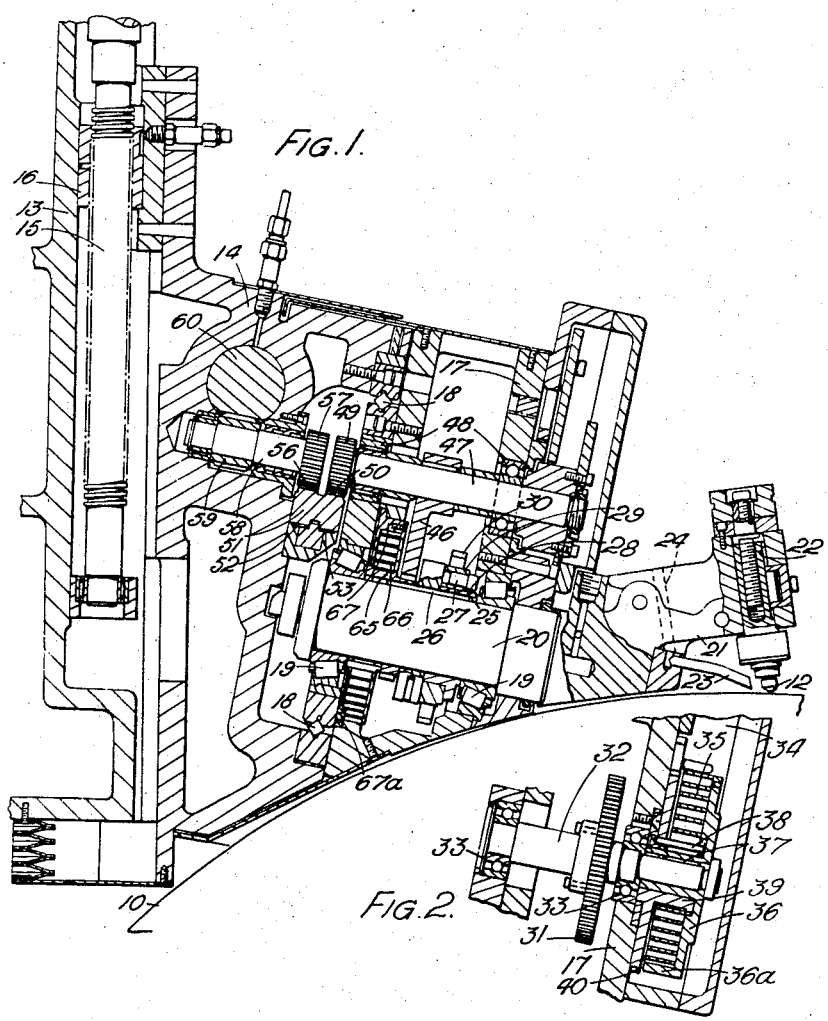
INVENTORS
Wilfred Keith Temple
Derek Albert Baker
Watson, Cole, Grindle + Watson
ATTORNEYS

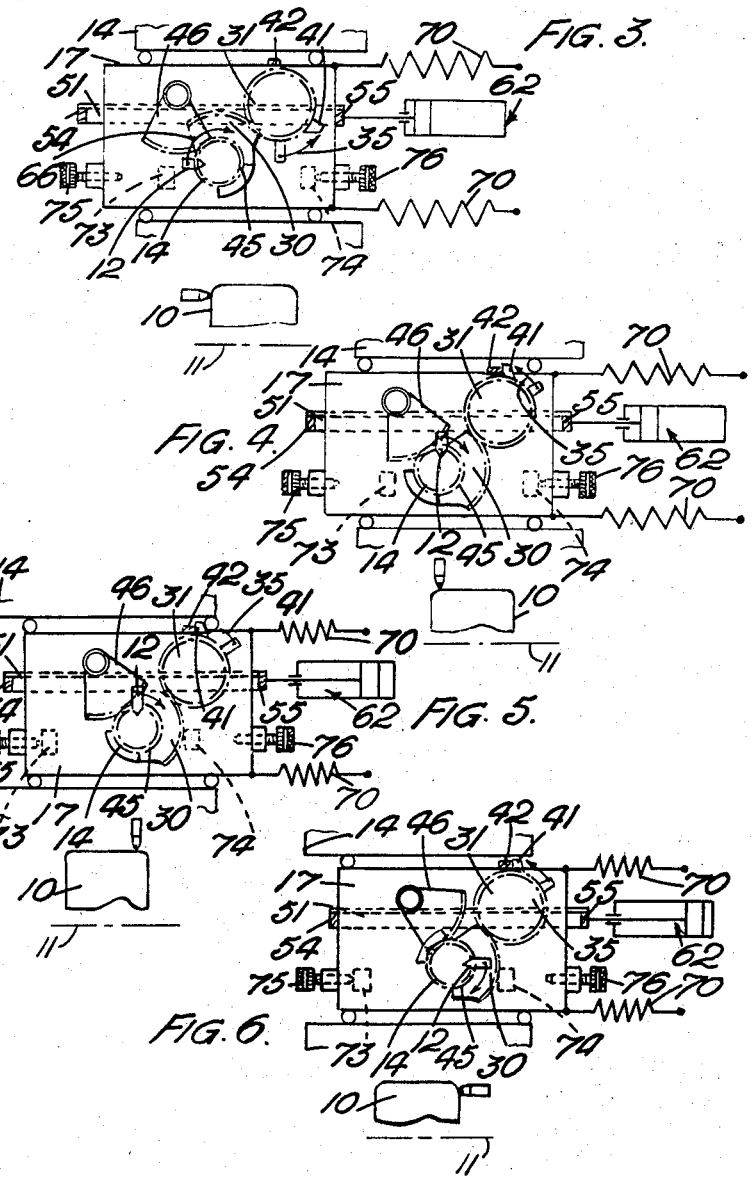

United States Patent Office 3,411,491
Patented Nov. 19, 1968

3,411,491
MACHINING APPARATUS FOR DRESSING DEVICES
Wilfred Keith Temple and Deryck Albert Baker, Peterborough, England, assignors to The Newall Engineering Company Limited, Peterborough, Northamptonshire, England, a British company
Filed Jan. 25, 1966, Ser. No. 522,959
Claims priority, application Great Britain, Jan. 29, 1965, 4,171/65
3 Claims. (Cl. 125—11)

ABSTRACT OF THE DISCLOSURE

A dressing device for a grinding wheel having means for traversing a tool along the peripheral surface of the grinding wheel and around the radius at the ends. The tool is rotatably mounted on a slide and rotated relative to the slide by a spring means to dress the radius and the slide is moved to carry the tool across and dress the peripheral surface.

---

This invention relates to machining apparatus and has an important but not exclusive application in dressing devices for dressing grinding wheels.

According to this invention there is provided a machining apparatus for traversing a tool along a peripheral surface of a workpiece and around a radius at one lateral edge of said surface, which tool comprises a tool holder rotatably mounted on a slide which is in turn mounted for rectilinear movement on a support structure, a rack mounted on the slide for rectilinear movement relative to the slide and connected through a first lost motion mechanism to move the slide rectilinearly on the support structure, stop means on the support structure for limiting said movement of the slide, a gear rotatably mounted on the slide and meshing with the rack which gear is coupled to rotate the tool holder whereby movement of the rack relative to the slide to take up said lost motion drives said gear and rotates the tool holder, a motor connected to drive the rack relative to the support structure in such a manner that the linear speed of movement of the rack relative to the support structure bears a constant relationship to the motor speed over the full movement of the rack, and spring means adapted and arranged for ensuring that the slide is stationary while the gear is being driven by the rack and that the gear does not rotate when the slide is in motion.

According to a preferred feature of the invention the apparatus is adapted for traversing a tool around a radius at opposite lateral edges of said surfaces, and the tool holder is carried by a shaft which is gear-driven from the first said gear and which is geared to a second gear rotatably mounted on the slide, the geared connection between the first said gear and said shaft incorporating a second lost motion device, the spring means including a spring urging the second gear rotationally towards a fixed stop on the slide and another spring urging the lost motion device into an end position. Preferably, the two springs tend to rotate the shaft in a common direction, the construction and arrangement being such that said one spring produces a greater force on the rack than said other spring.

According to another preferred feature of the invention, the spring means comprises a plurality of springs all operative to urge the tool holder in the same direction along the travel of the holder.

According to another preferred feature of the invention the spring means further comprises a third spring urging the slide towards one end of its restricted travel defined by said stop means, which spring exerts a greater force on the rack than said other spring, said one spring exerting a greater force on the rack than said other spring and said third spring together.

The motor may conveniently comprise a piston and cylinder motor arranged with its line of action parallel to the direction of movement of the slide and of the rack relative to the slide, the piston being connected to the rack.

According to the invention in another aspect machining apparatus as set forth in the second paragraph of this statement is incorporated in a grinding machine comprising a grinding wheel and constitutes a dressing device for the grinding wheel, the slide being adapted and arranged to traverse the tool holder parallel to the axis of the grinding wheel for enabling a dressing tool in the tool holder to dress the wheel surface. Preferably the tool holder provides a socket for the dressing tool such that the lengthwise dimension of the socket is disposed at an acute angle to the axis of rotation of the holder. In one such arrangement the tool holder carries indexing means for rotating a dressing tool in the holder step-by-step.

One embodiment of the invention will now be described by way of example as applied to a dressing device for dressing a grinding wheel. The description makes reference to the accompanying drawings in which:

FIGURE 1 shows a cross-section of the dressing device on a plane at right angles to the axis of the grinding wheel, FIGURE 2 shows a detail, and FIGURES 3 to 6 illustrate diagrammatically in plan the steps in the operation of the device.

Referring first particularly to FIGURES 3 to 6 the grinding wheel 10 is rotatable about an axis 11, and a diamond tipped dressing tool 12 is provided for re-cutting the profile of the grinding wheel when, for one reason or another, the grinding surface of the wheel loses its efficiency. The dressing tool is, for clarity, shown twice in each of the FIGURES 3 to 6, once in relation to the tool actuating mechanism, and once in relation to the grinding wheel. The diamond tool is rotated through 90° into the position shown in FIGURE 4 to shape one corner radius of the wheel. The tool is then traversed parallel to the grinding wheel axis to the position shown in FIGURE 5, and is finally rotated through 90° into the position shown in FIGURE 6 to shape the other corner radius of the wheel.

Referring now to FIGURES 1 to 3, the device includes a base part 13 on which a carriage 14 is slidably mounted for movement in a direction at right angles to the axis of the grinding wheel. Control of this movement is effected by a screw and nut mechanism including a vertically-disposed rotary screw 15 mounted in journals in body part 13 and a nut 16 held in the carriage 14. The construction is arranged to enable the carriage to be moved relative to the nut in a direction parallel to the screw to allow for retraction of the tool 12 from the wheel 10 at the completion of the dressing operation.

Carriage 14 provides a slideway in which a slide 17 is mounted on crossed roller bearings 18. The slide 17 carries, in taper roller bearings 19, a first shaft 20 having formed integrally therewith an upper cranked portion 21 having an inclined bore 22 in which the diamond tipped tool 12 is mounted. The position of the tool can be adjusted lengthwise of the bore 22, the adjustment being such that the diamond tip of the tool is offset from the axis of the shaft 20 by an amount appropriate to the radius to be machined on the corned of the grinding wheel. The portion 21 carries a nozzle 23 for delivery of cooling fluid to the diamond tip supplied through a passage 24 in portion 21.

A collar 25 is secured to rotate with the shaft 20 by a key 26 and has a peripherally-extending cut-away 28 engaged by an axially extending peg 27 which is mounted in the hub 29 of a gear segment 30 which is mounted on the collar concentrically with the shaft 20. The arcuate cut-away 28 is of a length to permit the gear segment 30 to rotate through an angle greater than 90° relative to the first shaft 20. Gear segment 30 is rotatable relative to the collar 25 and meshes with a gear wheel 31 (FIGURE 2) secured to a second shaft 32 mounted parallel to shaft 20 in bearings 33 carried by the slide 17. The upper end of second shaft 32 projects into a chamber 34 in the slide and is encircled by a spiral spring 35. The outer end of the spiral spring is secured to the outer flange 36a of a flanged drum 36 which is connected by a key 37 to the shaft 32, and the inner end of the spring is secured to a peg 38 carried by a flanged boss 39 encircling the hub of drum 36. The flanged boss has teeth 40 on its flange to enable it to be rotated to adjust the tension in the spring 35. Spring 35 can drive shaft 32 in a counterclockwise direction (viewed in plan) to drive slotted gear segment 30 in a clockwise direction. A peg 41 is mounted on the outside of the drum flange 36a (see FIGURE 3) and a stop 42 fixed to the slide 17 stands in the path of movement of the peg to limit unwinding movement of the spiral spring 35.

A pinion 45 secured to the first shaft 20 by the key 26 meshes with a gear segment 46 which is secured on a third shaft 47 disposed parallel to the other two shafts in bearings 48 in the slide 17. At its lower end the third shaft 47 has a gear pinion 49 formed integrally therewith which meshes with a first set of teeth 50 on a rack 51 backed through needle rollers 52 by a bar 53 secured to the carriage 14. The rack projects beyond the slide 17 at each end as shown in FIGURE 3, and adjustable stops 54, 55 are mounted on the respective ends of the rack to limit the movement of the rack relative to the slide 17 in each direction, these stops and corresponding abutment surfaces on the slide constituting a first lost motion connection.

A second set of gear teeth 56 is formed on the lower portion of the rack 51 and meshes with a pinion 57 formed integrally with a fourth shaft 58 mounted in bearings in the carriage. A toothed sleeve 59 is secured on this shaft and meshes with rack teeth formed on the side of the piston 60 slidably mounted in slide 17 for movement parallel to the axis of the grinding wheel. Piston 60 is the output member of a hydraulic motor 62 of which the cylinder is fixed on the carriage 14. The connection between motor 62 and rack 51 is shown in a simplified form in diagrammatic FIGURES 3 to 6.

A hub 65 secured on the first shaft 20 below the pinion 45 by key 26 has secured to it the inner end of a coil spring 66, the outer end of which is fastened to the periphery of a drum 67 which has gear teeth 67a engaged by gear means, not shown, such that the drum can be rotated and secured in selected positions of rotation in order to permit the tension of the spring 66 to be adjusted.

The slide has connected to it tension springs 70 (see FIGURE 3) of which the other ends are anchored to the carriage. These springs urge the slide in one direction of dressing across the periphery of the grinding wheel.

Two stops 73, 74 (see FIGURE 3) secured to the carriage 14 limit the linear movement of the slide 17 along the slideway in each direction, and adjustable stop-screws 75, 76 on the slide co-operate with the fixed stops and permit adjustment of the end positions of the slide.

When the motor 62 is operated, the fourth shaft 58 is rotated and drives the rack 51, and according to the respective conditions of the various springs and lost motion connections as decribed more fully below, the rack in turn either moves the slide 17 or rotates the first shaft 20 to swivel the diamond dressing tool 12.

The tensions of the two spiral springs 35, 66 and of the tension springs 70 are adjusted so that the force exerted by the tension springs 70 is greater than the force exerted at the rack teeth by coil spring 66 and so that the force exerted at the rack teeth by coil spring 35 is greater than that exerted by the tension springs 70 and coil spring 66 together.

Before the commencement of the dressing movement proper of the diamond tool 12, the piston 60 and cylinder motor 62 are operated to move the piston into one or the other of its extreme positions. It will be assumed that rack 51 is brought to the position shown in FIGURE 3, in which the rack 51 is at the leftward extremity of its lost motion relative to the slide 17, and the slide is at the leftward extremity of its movement relative to carriage 14, the adjustable stop screw 76 abutting the fixed stop 74. The gear segment 30 is held at the counterclockwise extremity of its movement by one end of the arcuate cut-away 28 bearing against the peg 27 on the hub 29 of the gear segment. The directions in which the coil spring forces act are shown by the arrows in FIGURES 3 to 6.

When the motor 62 is operated to move piston 61 and the rack 51 to the right, coil spring 35 acts through gear wheel 31, gear segment 30 and peg 27 to rotate shaft 20 and the diamond tool 12 clockwise through 90° into the position shown in FIGURE 4 to dress the first corner portion of the grinding wheel. The strength of spring 35 overcomes springs 66 and 70 and holds the slide at the left hand extremity of its travel throughout this rotation of the shaft 20 and tool. The speed of movement of the rack determines the speed of rotation of the tool. At the end of the 90° movement of the shaft 20 and tool 12, peg 41 on the drum flange 36a engages stop 42 to prevent further rotation of the tool by spring 35. The tool does not stop or pause however, because spring 35 now exerts no force on the rack, and since springs 70 exert a greater force at the rack than the coil spring 66, continued movement of piston 61 to the right moves the slide bodily to the right until the stop screw 75 on the slide abuts stop 73, as shown in FIGURE 5, and during this movement of the slide, the tool 12 moves axially at the same speed as the slide across the periphery of the grinding wheel.

Again, there is no halt or pause in the movement of the tool, because springs 35 and 70 now exert no force on the rack, and continued rightward movement of the piston and rack 51 permits coil spring 66 acting on shaft 20 through hub 65 and key 26 to rotate the shaft and tool 12 clockwise. During this rotation the lost motion of the collar relative to peg 27, gear segment 30 and gear wheel 31 permitted by the arcuate slot 28 is then taken up. The shaft 20 and tool are rotated through 90° in this way into the position shown in FIGURE 6 while slide 17 remains stationary against stop 73. This rotation of the tool dresses the other corner portion of the grinding wheel and is terminated by abutment of stop 54 on the rack against the end of the slide. The tool is then moved away from the grinding wheel by appropriate movement of the carriage 14.

Reverse movement of the piston 61 into the starting position returns all the components to their starting positions and re-loads all the springs. This reverse movement can equally be used to perform a dressing operation because the sequence of movements of the tool is merely reversed.

It ill thus be understood that continuous movement of the piston 61 ensures a corresponding uninterrupted and uniform movement of the dressing tool around the first corner portion of the wheel 10, axially along the periphery of the wheel, and around the second corner portion. The gear ratios are so arranged that when the dressing tool is set to machine the mean radius in its range of adjustment, the linear speed of movement of the tip of the tool is constant, for a constant speed of piston 60, over the entire travel, i.e. the first arcuate portion, the straight portion and the second arcuate portion, of the tip. The gears could however be changed according to the radii of the corners of the wheel, if desired, to ensure that the linear rate of travel of the dressing tool across the periphery and around the corners is constant for a constant speed of motor 62. It will be understood that any variation in the speed of travel of the dressing tool over the surface of the grinding wheel tends to produce a corresponding change in the quality of a surface ground with the wheel. Pauses in the travel of the tool are avoided in the illustrated arrangement by the fact that the springs all urge the tool in the same direction of travel, so that no backlash remains to be taken up at any point in the movement of the dressing tool.

The speed of travel of piston 60, which determines the overall speed of the dressing tool and hence the quality of finish produced by the grinding wheel being dressed, is adjustable by means of rate valves controlling the rate of flow of actuating fluid.

It will also be clear that the device is of the generating type as distinct from the copying type, i.e. the shape of the grinding surface of the wheel is generated instead of being formed as a replica of a master shape.

Interlocks (not shown), which may conveniently be electrical, are provided to ensure that if the correct sequence of rotational and linear movements becomes disturbed, for example by external influences, the supply of pressure fluid to the hydraulic motor 62 is cut off. The interlocks may comprise switches operated by the tool at its 0°, 90° and 180° positions of rotation, actuating signals which are related in an electrical circuit to electrical signals obtained when the end stops are contacted at the ends of the different stages of the movement of the tool. The circuit in turn controls solenoid operated valves in the pressure fluid supply to the motor.

In the illustrated embodiment, the axis of the tool is slightly inclined to the radius of the grinding wheel at the point of contact, and to the axis of shaft 20, so that the plane of movement of the tip of the tool during the dressing of the corner of the wheel is inclined to a radial plane of the wheel at the point of contact. In consequence, the device does not generate a true circular arc on the corner of the wheel, but the arc generated is sufficiently accurate for normal purposes of the wheel. The cranked portion may if desired be extended to make the two said planes coincident so as to form the edge of the wheel as a true circular arc, but the illustrated arrangement has the advantage of the lesser overhang of the tool beyond the end of shaft 20, and hence greater stiffness.

In use of the device the length of stroke of motor 62 is adjusted so that at the commencement of the first arcuate movement and at the end of the second arcuate movement of the tool the tip of the tool is a few thousandths of an inch clear of the side of the wheel. The slight imperfection of surface blending which results on the grinding wheel tends in many instances to be corrected by wear during the inward feed of the wheel where the side face of the wheel makes first contact with the part being machined.

The tool holder is of the kind which incorporates an indexing mechanism to rotate the tool through a small angle after each pass of the tool in order to maintain the conical shape of the point of the tool, and thus to maintain the accuracy of the blend between the rectilinear and arcuate portions of the surface generated on the wheel.

We claim:

1. A machine apparatus for traversing a tool along a peripheral surface of a workpiece and around a radius at one lateral edge of said surface, which tool comprises a tool holder rotatably mounted on a slide which is in turn mounted for rectilinear movement on a support structure, a rack mounted on said slide for rectilinear movement relative to said slide and connected through a lost motion mechanism to move said slide rectilinearly on said support structure, stop means on said support structure for limiting said movement of said slide, a first gear rotatably mounted on said slide and meshing with said rack, said first gear being coupled to rotate said tool holder whereby movement of said rack relative to said slide to take up said lost motion drives said first gear and rotates said tool holder, a motor connected to drive said rack relative to said support structure in such a manner that the linear speed of movement of said rack relative to said support structure bears a constant relationship to the motor speed over the full movement of said rack, and spring means adapted and arranged for ensuring that said slide is stationary while said first gear is being driven by said rack and that said first gear does not rotate when said slide is in motion, said tool holder being carried by a shaft which is gear-driven from said first gear and which is geared to a second gear rotatably mounted on said slide, the geared connection between said first gear and said shaft incorporating a further lost motion device, said spring means including a first spring urging said second gear rotationally toward a fixed stop on said slide and a second spring urging said further lost motion device into an end position.

2. A machining apparatus as claimed in claim 1, wherein said first and said second springs tend to rotate said shaft in a common direction, the construction and arrangement being such that said first spring produces a greater force on said rack than said second spring.

3. A machining apparatus as claimed in claim 2, wherein said spring further comprises a third spring urging said slide toward one end of its restricted travel defined by said stop means, said first spring exerting a greater force on said second spring, and said first spring exerting a greater force on said rack than said second spring and said third spring together.

References Cited

UNITED STATES PATENTS

| 2,294,492 | 9/1942 | Wilson | 125—11 |
| 2,845,920 | 8/1958 | Bruce | 125—11 |
| 2,922,413 | 1/1960 | Schultze | 125—11 |

FOREIGN PATENTS

| 383,191 | 4/1963 | Japan. |

HAROLD D. WHITEHEAD, *Primary Examiner.*